United States Patent [19]

Osawa et al.

[11] Patent Number: 4,783,140

[45] Date of Patent: Nov. 8, 1988

[54] ELASTOMERIC OPTICAL WAVEGUIDE WITH CORE AND CLADDING IMPARTED WITH ELASTICITY BY IRRADIATION OF A RADIOACTIVE RAY

[75] Inventors: Yoshitaka Osawa; Takafumi Uemiya; Shin-ichiro Niwa; Akira Nishimura; Yutaka Shibata, all of Osaka, Japan

[73] Assignee: Sumitomo Electric Industries, Ltd., Osaka, Japan

[21] Appl. No.: 846,608

[22] Filed: Mar. 28, 1986

[30] Foreign Application Priority Data

Mar. 30, 1985 [JP] Japan ................................. 60-67876
Feb. 21, 1986 [JP] Japan ................................. 61-37796

[51] Int. Cl.$^4$ .............................................. G02B 6/16
[52] U.S. Cl. .................................. 350/96.34; 350/96.30
[58] Field of Search ............... 350/96.11, 96.12, 96.13, 350/96.15, 96.23, 96.29, 96.30, 96.33, 96.34

[56] References Cited

U.S. PATENT DOCUMENTS

| | | | |
|---|---|---|---|
| 4,094,606 | 6/1978 | Camphausen | 350/96.34 X |
| 4,294,507 | 10/1981 | Johnson | 350/96.13 |
| 4,317,616 | 3/1982 | Clark | 350/96.34 |
| 4,431,264 | 2/1984 | Clarke | 350/96.34 |
| 4,591,608 | 5/1986 | Okinoshima | 522/13 |
| 4,708,833 | 11/1987 | Ohswawa et al. | 350/96.34 X |

*Primary Examiner*—John Lee
*Attorney, Agent, or Firm*—Cushman, Darby & Cushman

[57] ABSTRACT

An elastomeric optical waveguide comprising a core and a cladding surrounding the core in which at least the core comprises an elastomer to which elasticity is imparted by irradiation of a radioactive ray, which has low attenuation of light transmission.

7 Claims, No Drawings

ELASTOMERIC OPTICAL WAVEGUIDE WITH CORE AND CLADDING IMPARTED WITH ELASTICITY BY IRRADIATION OF A RADIOACTIVE RAY

FIELD OF THE INVENTION

The present invention relates to an elastomeric optical waveguide.

BACKGROUND OF THE INVENTION

Plastic optical waveguides, made of a non-elastomeric thermoplastic polymer such as polymethyl methacrylate are known and used. However, any waveguide made of an elastomer having elasticity has not been practically used. One of the reasons for this is that the elastomer has a large attenuation of light transmission due to the method of manufacturing the elastomer.

To impart elasticity to liquid siloxane polymer, a cross-linking agent and/or a cross-linking aid are usually added to the polymer, or the polymer is heated. The addition of the cross-linking agent and/or the cross-linking aid, however, increases the attenuation of light transmission. Further heat treatment of the polymer causes irregularities such as peeling at an interface between a cladding and a core due to thermal shrinkage, thereby the attenuation of light transmission is increased.

SUMMARY OF THE INVENTION

An object of the present invention is to provide an elastomeric optical waveguide having rubbery elasticity.

Another object of the present invention is to provide an elastomeric optical waveguide having low attenuation of light transmission.

A further object of the present invention is to provide an elastomeric optical waveguide which suffers substantially no thermal shinkage.

These and other objects are accomplished by an elastomeric optical waveguide comprising a core and a cladding surrounding the core in which at least the core comprises an elastomer to which elasticity is imparted by irradiation with a radioactive ray.

DETAILED DESCRIPTION OF THE INVENTION

A material to which elasticity is imparted by irradiation is selected from conventional materials having such property. Preferred examples of such materials are a liquid or gummy polybutadiene, styrene-butadiene copolymer acrylonitrile-butadiene copolymer, siloxane polymer and the like. Among them, liquid or gummy siloxane polymers are preferred.

Among the siloxane polymers, dimethylsiloxane polymer are preferred because of good irradiation characteristics and low attenuation of light transmission of the irradiated polymers. Siloxane polymers containing vinyl groups are also preferred since they can be made elastic by a smaller amount of exposure than siloxane polymers containing no vinyl group.

To increase the quantity of light to be transmitted through the core, differences between the refractive index of the core and the cladding should be large. From this view point, siloxane polymers having phenyl or naphthyl groups are desirable as the core material, and a fluorine-containing siloxane polymer is desirable as the cladding material. As the cladding material, fluorine-containing elastomeric polymers such as vinylidene fluoride-trifluorochloroethylene copolymer or vinylidene fluoride-hexafluoropropylene copolymer are preferred.

According to the present invention, a non-elastomeric cladding material may be used, for example polymethyl methacrylate, polystyrene and fluorine-containing resins (e.g. polytetrafluoroethylene (PTFE), tetrafluoroethylene-hexafluoropropylene copolymer (FEP) and the like).

As a radioactive ray, any of the conventionally used ones may be utilized for imparting elasticity to the core material and/or the cladding material according to the present invention. Examples of the radioactive ray are $\alpha$-ray, $\beta$-ray, $\gamma$-ray, and X-ray. Among them, $\beta$-ray, namely an accelerated electron beam is preferred.

The exposed dosage varies with the kind of the material. It is usually from 0.1 to 100 Mrad, preferably from 1 to 40 Mrad.

The optical waveguide of the invention may be fabricated by various methods. For example, in a tube-form cladding having sufficient strength, the liquid or gummy material is filled and irradiated from the outside of the cladding. In on other method, the cladding and core materials are co-extruded with irradiation.

Since the optical waveguide of the invention contains neither cross-linking agents nor cross-linking aids, it has lower attenuation of light transmission.

Since the optical waveguide of the invention is not heated after fabrication, it suffers no thermal shinkage so that it does not have any interfacial, irregularities between the cladding and the core and thereby the attenuation of light transmission is not increased.

The present invention will be explained in further detail by the following examples.

EXAMPLE 1 AND COMPARATIVE EXAMPLES 1-2

For imparting elasticity to the material, accelerated electron beam in Example 1, a cross-linking agent in Comparative Example 1 or a combination of a cross-linking agent and a catalyst in Comparative Example 2 were used under following conditions:

(Example 1)

1.75 MeV, 10 mA, about 4.8 seconds of irradiation.

(Comparative Example 1)

Cross-linking agent: t-butylperoxyhexanoate (Nippon Fat & Oil) 1% by weight
Heating: 150° C.×0.5 hour.

(Comparative Example 2)

Cross-linking agent: methylhydrodimethylsiloxane copolymer having trimethyl groups at both ends (viscosity: 25 cst, concentration: 2.2 g per 10 g of the liquid siloxane polymer).
Catalyst: solution of chloroplatinic acid in isopropanol (concentration: 10 ppm by weight as converted to platinum weight)
Heating: room temperature×2 hours.

Under the above conditions, liquid siloxane polymer (polydimethylisiloxane having dimethylvinyl groups at both chain ends, viscosity: 10,000 cst) was imparted with elasticity to give an elastomeric material. Transparency of the irradiated polymer was evaluated by measuring light transmissivity at a wavelength of 350 nm by means of a spectrophotometer.

The results are shown in the Table.

TABLE

|  | Transmissivity (%) |
| --- | --- |
| Example 1 | 87.1 |
| Comp. Ex. 1 | 82.0 |
| Comp. Ex. 2 | 50.1 |

Example 2

In an FEP tube having an outer diameter of 3 mm, an inner diameter of 2 mm and a length of about 3 m, polydimethylsiloxane (viscosity: 10,000 cst) was filled and sealed and irradiated by electron beam at 1 MeV, 1 mA for 40 minutes (16 Mrad) to fabricate an optical waveguide. It was cut in a length of 2.8 m and measured for attenuation of light transmission to find that attenuation was 400 dB/km at a wavelength of 640 nm.

Example 3

In the same FEP tube as used in Example 2, dimethylsiloxane-diphenylsiloxane copolymer having dimethylvinyl groups at the both chain ends (viscosity: 60,000 cst, phenyl content: 3% by mole, $n_D = 1.42$) was filled and sealed and irradiated by electron beam under the same condition as in Example 1 to fabricate an optical waveguide. It was cut in a length of 2.8 m and measured for attenuation of light transmission to find that attenuation was 1,000 dB/km at a wavelength of 640 nm.

Example 4

On an inner surface of a rubber tube having an outer diameter of 6 mm, an inner diameter of 4 mm and a length of about 2 m, a solution of vinylidene fluoride-hexafluoropropylene copolymer in methyl ethyl ketone (concentration: 10% by weight) was dip coated and dried overnight at a room temperature to form a cladding. In the tube having the cladding layer, polydimethylsiloxane having dimethylvinyl groups at both chain ends (viscosity: 10,000 cst) was filled and sealed and irradiated by electron beam at 3 MeV, 0.6 mA for 20 minutes (8 Mrad) to fabricate an optical waveguide. It was cut in a length of 1.8 m and measured for attenuation of light transmission to find that attenuation was 300 dB/km at a wavelength of 640 nm.

Example 5

In methyl ethyl ketone (250 ml), dissolved was a mixture of polydimethylsiloxane having dimethylvinyl groups at both chain ends (viscosity: 10,000 cst) and dimethylsiloxane-methylhydrogensiloxane copolymer (viscosity: 30 cst) (weight ratio of 10:1) (100 g) containing a solution of chloroplatinic acid in isopropanol in such an amount that the concentration of platinum was 100 ppm in the mixture. Then, the solution the dip coated on an inner surface of the same tube as used in Example 4 and dried overnight at a room temperature and then at 70° C. for 3 hours to form a cladding. In the tube having the cladding layer, dimethylsiloxane-diphenylsiloxane copolymer having dimethylvinyl groups at both chain ends (viscosity: 60,000 cst, phenyl content: 5% by mole, $n_D = 1.43$) was filled and sealed and irradiated by electron beam at 3 MeV, 0.6 mA for 40 minutes (16 Mrad) to fabricate an optical waveguide. It was cut in a length of 1.8 m and measured for attenuation of light transmission to find that attenuation was 2,000 dB/km at a wavelength of 640 nm.

What is claimed is:

1. An elastomeric optical waveguide comprising a core and a cladding surrounding the core in which at least the core comprising an elastomer to which elasticity is imparted by irradiation of a radioactive ray, wherein the elastomer contains no additive for enhancing or imparting elasticity.

2. The elastomeric optical waveguide according to claim 1, wherein both of the cladding and the core are imparted with elasticity by irradiation of the radioactive ray.

3. The elastomeric optical waveguide according to claim 1, wherein the elastomer is liquid or gummy polysiloxane to which elasticity is imparted by irradiation of the radioactive ray.

4. The elastomeric optical waveguide according to claim 1, wherein the elastomer is liquid or gummy polysiloxane having vinyl groups to which elasticity is imparted by irradiation of the radioactive ray.

5. The elastomeric optical waveguide according to claim 1, wherein the elastomer is liquid or gummy polydimethylsiloxane to which elasticity is imparted by irradiation of the radioactive ray.

6. The elastomeric optical waveguide according to claim 1, wherein the core comprises liquid or gummy polysiloxane having phenyl or naphthyl groups to which elasticity is imparted by irradiation of the radioactive ray.

7. The elastomeric optical waveguide according to claim 1, wherein the cladding comprises liquid or gummy polysiloxane having fluorine-containing groups to which elasticity is imparted by irradiation of the radioactive ray.

* * * * *